Patented May 24, 1938

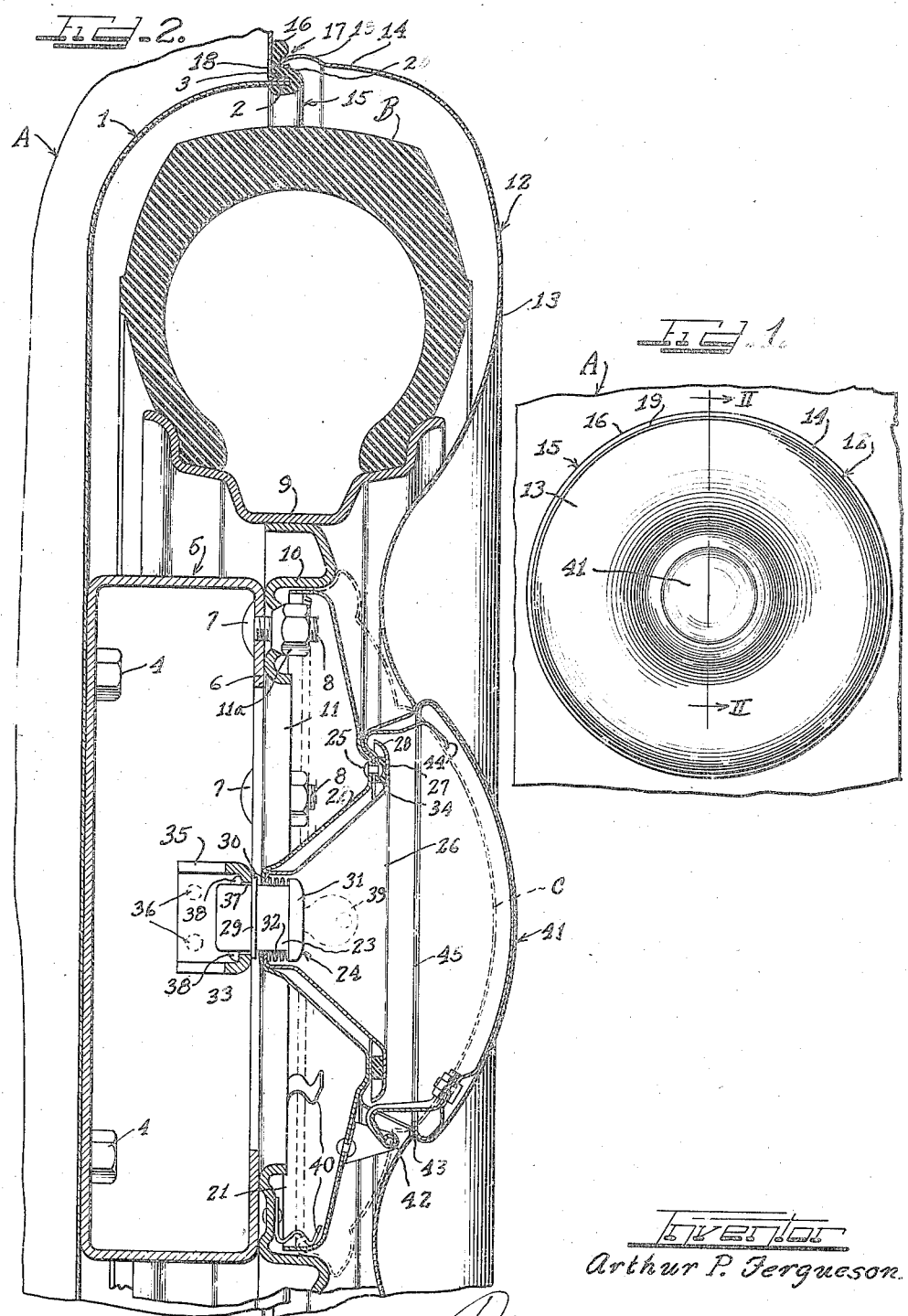

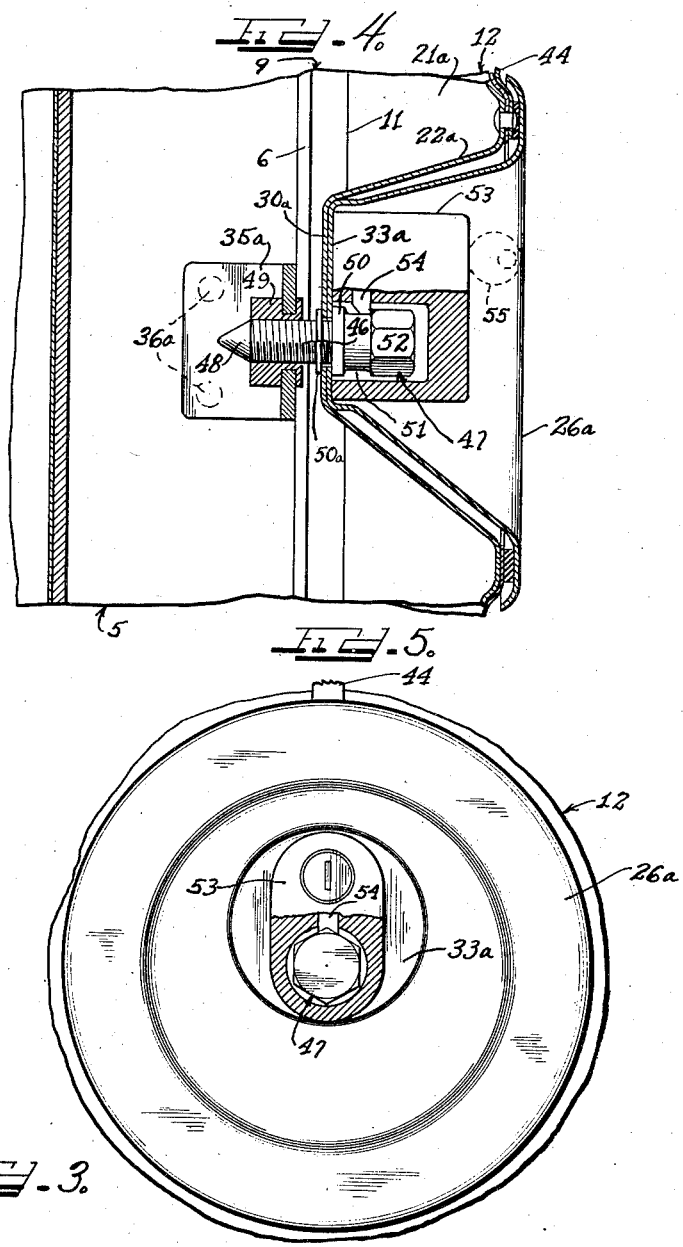

2,118,596

UNITED STATES PATENT OFFICE 2,118,596

TIRE COVER

Arthur P. Fergueson, Detroit, Mich., assignor, by mesne assignments, to Houdaille-Hershey Corporation, Detroit, Mich., a corporation of Michigan Application December 24, 1935, Serial No. 56,062

3 Claims. (Cl. 296—37)

This invention has to do with tire covers and is concerned more particularly with a cover adapted for cooperation with a body having a substantially circular well in which a part the spare wheel and tire assembly is adapted to be received.

It is an object of the invention to provide a cover for a wheel assembly, adapted to be locked in position by a snap-on or other action in a position where the wheel assembly is completely shielded from view.

It is another object of the invention to provide a wheel assembly cover structure adapted to be shoved into locked relation to the assembly and be cushioned from the vehicle body.

It is a further object of the invention to provide a spare wheel assembly cover with means for locking the same centrally to a wheel support independently of the wheel, and also peripherally to the vehicle body provided with the support.

It is also an object of the invention to provide a unitary wheel assembly cover for cooperation with a recessed body shaped to receive the assembly, whereby the cover may be pressed against the body in a position to substantially conceal the recess, by a central lock structure cooperating with the body.

It is another object of the invention to provide a wheel assembly cover for cooperation with a recessed body to receive the assembly, whereby the cover is centrally locked to the body and resiliently engaged with the body at the mouth of the recess.

Another object of the invention involves the provision of a double wall and adapted to be spaced from a wheel assembly for cooperation with a recessed body shaped to receive the wheel assembly, including a lock for securing the cover to the body and an anti-rattling joint between the outer peripheral part of the cover and the body.

A further object of the invention involves the provision of a spare wheel assembly cover unit adapted to be hooked on to a part of the body supporting the assembly and provided with lock means for securement to the body independently of the assembly.

In accordance with one form of the invention, a vehicle body is provided with a generally circular well and a wheel support arranged substantially centrally of the well, to which the inner attaching part of the wheel is adapted to be releasably fastened. The well preferably is of such depth as to receive the rear side and part of the periphery of the spare wheel. A side plate structure is provided to shield the outer side and remaining tread portion of the tire, cushion means being interposed between the side plate structure and the body at the well for anti-rattling purposes. The side plate structure is preferably provided with means adapted to lock the same to the spare wheel support in a portion to prevent unauthorized access to the wheel attaching means, and the same locking means is adapted to compress the anti-rattling means. The locking means may be of the spring snap-on type adapted to be locked upon a single shoving movement of the cover structure, and releasable by key or otherwise to permit removal of the cover by substantially a single axial movement. The cover structure may be telescoped within or outside of the well.

Instead of using a snap-on locking mechanism, the cover structure may be bolted into position and suitable lock mechanism applied to the bolt to prevent unauthorized release of the bolt.

The cover structure is preferably provided with a closure cap seat to be engaged by a closure cap to conceal the locking means, yet adapted to be moved to open position to render the locking means accessible without necessitating removing of the side plate structure.

It will be evident that the invention comprises a minimum of parts and yet provides for a complete protection of the wheel and tire assembly against theft and against inclement weather. The construction is further advantageous in that it provides for the positioning of the spare wheel and tire assembly in a well so that when the cover structure is in place it does not materially increase wind resistance.

Further objects and advantages of the invention will appear as the description proceeds.

This invention (in preferred forms) is illustrated in the drawings and hereinafter more fully described.

Figure 1 is a fragmentary elevational view of a portion of the body of a vehicle with the cover structure in accordance with one form of the invention mounted thereon.

Figure 2 is an enlarged fragmentary sectional view taken substantially as indicated by the line II—II in Figure 1.

Figure 3 is a fragmentary sectional view similar to the upper part of Figure 2 but showing a modified construction.

Figure 4 is a fragmentary sectional view similar to the lower central part of Figure 2 but shows a modified construction.

Figure 5 is a fragmentary front elevation of the structure shown in Figure 4.

Referring now more particularly to the drawings, there is illustrated a portion of a body A having a preferably substantially circular well 1 whose margin 2 preferably extends outward from the body and is welded or otherwise suitably secured to an outwardly extending lip 3 on the body. The well 1 may be further suitably supported from the body A or other part of the vehicle as desired. Bolts 4 or other suitable means centrally mount a spare wheel carrying bracket or support 5 in the well. This support is provided with an inturned flange 6 which preferably permanently carries bolts 7 whose threaded ends 8 project outwardly from said flange.

The spare wheel 9 carrying the spare tire B may be of the drop-center or any other suitable rim type and may be provided with a hub 10 from which extends inwardly a wheel attaching flange 11. The flange 11 is provided with a circumferential series of holes adapted to receive the shanks 8 of the support bolts 7, and also adapted to receive the nuts 11a to securely and removably mount the wheel from the support 5. When the wheel is so supported, it will be observed from Figure 2 that substantially half of the wheel and the tire is disposed within the well 1.

For shielding the outer side of the wheel and tire as well as the exposed tread portion of the tire there is provided a side plate structure 12 including an outer side portion 13 for covering the front of the wheel and tire and a rim portion 14 for disposition about the exposed part of the tread when the tire is in the well. A preferably circular cushioning bead of rubber or the like as shown at 15 is preferably secured over the protruding well margin 2 and body lip 3 so as to completely conceal them and provide an attractive surface finish at the mouth of the well. The bead 15 preferably extends outwardly as at 16, providing an outwardly opening circumferential recess 17 adapted to snugly receive the rounded free edge portion 18 of the cover rim portion 14. Said rounded edge portion 18 is provided at the rear of a bead-like protuberance 19 provided to reinforce and enhance the appearance of the side plate structure where it substantially meets the body A.

It will be observed that the bead strip 15 provides a ledge 20 over which the edge 18 of the side plate structure may hook and be swung into proper sealed and centered relation to the well, irrespective of the presence or absence of the spare wheel and tire.

The side plate structure 12 is preferably formed so as to have a cross-sectional contour substantially conforming to that of the assembled spare wheel and tire. The structure 12 is provided substantially centrally thereof with a hood or shield 21 adapted to be telescopically received by the wheel hub 10 in a position to prevent access to the wheel attaching nuts 11a. The shield 21 is provided with a substantially central rearwardly extending projection 22 having an opening through which the barrel 23 of a lock structure 24 passes. Adjacent the outer part of the projection 22, the side plate 13 is joined to the shield 21 by rivets 25 or by welding or in any other suitable manner. To prevent access to the rivets 25 from the outside so as to discourage attempts to remove the side plate from the shield 21, there is provided a guard plate 26 having a peripheral flange 27 arranged to closely overlie the front of the riveted portion and having a rearwardly bent margin 28 disposed so close to the adjacent portion of the side plate 13 as to prevent the insertion of a tool between said edge 28 and said side plate to gain access to the rivets. The guard 26 is also preferably case-hardened or otherwise treated so as to discourage attempts at its mutilation.

The central part of the guard 26 projects rearwardly within the projection 22 of the shield 21 and is likewise provided with a hole through which the lock barrel 23 passes. The barrel 23 is provided with a collar 29 arranged to engage the rear side 30 of the end of the shield projection 22, and said barrel carries at its front end a flange 31 of greater size than the holes in the projection 22 and guard 26, so that the lock 24 is non-removably carried by said projection and guard.

A spring 32 disposed between the rear end portion 33 of the guard 26 and the lock flange 31 constantly urges the guard 26 toward the projection 22 and consequently the flange 27 toward the rivets 25. To prevent rattling between the guard 26 and the rivets 25, a resilient rubber or other cushion ring 34 is positioned therebetween, and secured either to the side plate 13 or guard 26, by bonding or other suitable means, as desired.

The support 5 may be provided with a strap or bar 35 welded at 36 or otherwise suitably secured thereto, and bridging the flange 6 and provided with a lock barrel receiving opening 37 which is preferably arranged at the axis of the wheel when the latter is mounted on the support. The lock barrel 23 is provided with preferably spring-pressed latches 38 having tapered rear faces so as to be cammed inwardly by the wall of the opening 37 as the barrel is passed rearwardly through said opening. Said latches are preferably formed on their front sides so as to lockingly engage the bar 35 at the rear of the opening 37, so as to require operation of a key 39 or other suitable anti-theft means in order to withdraw the latches sufficiently to permit the barrel to be removed from the bar 35. The latches 38 are preferably spaced from the collar of flange 29 by substantially the thickness of the bar 35 at the opening 37.

As seen in Figure 2, the spring 32 forces the side plate structure tightly against the peripheral cushion bead 15, thereby not only preventing rattling but also affording a seal to prevent moisture, dust and the like from gaining access to the spare wheel, tire and well. The rear part 30 of the projection 22 of the shield 21 may be spaced somewhat forwardly from the barrel flange 29 so as to provide sufficient clearance to enable the spring 32 to operate effectively in pressing the side plate structure 12 against the bead 15.

The wheel flange 11 is preferably provided with a suitable number of spring elements 40 engageable within the shield 21 to assist in centering the same in the hub 10 and also to floatingly support the shield within the hub. Said springs 40 are also operative to receive a service hub cap shown in dotted lines at C. It is thus evident that the side plate structure 12 and hub cap C are interchangeably engageable with the spring elements 40.

It is desirable to conceal the lock 24 and guard 26. To this end, there is provided a closure cap 41 of a form preferably simulating a hub cap, hinged at 42 preferably to the shield 21 and adapted to engage an outer seat 43 formed on the side plate 13 so as to completely conceal the lock 24, guard 26 and hinge mechanism. A latch spring 44 which may be of generally L-shape as shown is preferably secured to the side plate 13 by one of the rivets 25 and shaped outwardly so as to be cammed inward by an inturned margin 45 of the cap 41. Thus the spring 44 may be employed to readily and releasably latch the cap 41 in closed position. Said cap 41 may be readily pried off the spring 44 and allowed to swing open to render the lock 24 accessible.

If desired, the hinge structure could be replaced by one or more springs such as the spring 44 so that the cap 41 would be completely removable and could be snapped on and off over the springs. Three or any suitable number of springs may be provided.

When it is desired to apply the side plate structure 12, the rounded edge portion 18 thereof may be hooked over the ledge 20 of the bead strip 15, as at the upper part thereof, so that when the structure 12 is swung inwardly, the shield 21 readily telescopes in the wheel hub 10, the remainder of the edge 18 of the cover slips into the groove 17 in the bead 15, and the lock barrel 23 snaps into interlocked relation to the bar 35. Or, if desired, the periphery of the cover structure may be grasped and held substantially coaxial to the bead strip 15 and then shoved axially into place. The ledge 20 of the bead strip thus serves as a guiding as well as a centering means, and this is also true of the wheel hub 10 and the spring elements 40.

When it is desired to remove the cover structure 12, the cap 41 is pried off the spring 44 and turned to an open position, the key 39 is applied to the lock 24, releasing the latches 38 from the bar 35 and then the rim portion 14 of the side plate structure is grasped preferably at opposite portions thereof by the hands and thus withdrawn axially outwardly. After the structure 12 is removed, the nuts 11a are readily accessible. When the cover structure 12 is locked in position, the nuts 11a are protected against tampering, so that neither the cover structure, wheel nor tire may be removed in the absence of the proper key 39.

Figure 3 shows a modified structure for the connection between the vehicle body and the outer periphery of the side plate structure. In this modification, the body D is provided with a well 1a which may be made integral as shown or separate and fastened in any suitable manner. The side plate structure 12a is provided with a rim portion 14a which extends transversely inwardly a sufficient amount to project into the well. A resilient rubber or other cushion bead 15a is firmly secured to the edge of the rim portion 14a and is adapted to be pressed at its outer portion 16a against the inner surface of the well 1a, in response to the pressure of the spring 32, illustrated in Figure 2.

In connection with the form of the invention shown in Figure 3 when the side plate structure 12a is applied, the lower part thereof at the bead 15a may be allowed to rest within the lower part of the well 1a and the remainder swung upward and rearward into cooperation with the support bar 35, wheel hub 10 and well 1a. The portion of the wall of the well 1a engaged by the strip 15a preferably converges rearwardly so as to effect a wedging engagement with the strip 15a.

Figures 4 and 5 illustrate a modified locking structure. It is to be understood that, in connection with the form shown in Figures 4 and 5, all parts other than the locking means are to be considered as present, either as shown in Figure 2 or as shown in Figure 3.

In this modification, the shield 21a has its projection 22a formed eccentrically to its outer peripheral portion, terminating in a rear wall 30a, and the guard 26a is similarly formed, providing a rear wall 33a engageable with the wall 30a. Arranged eccentrically of the walls 30a and 33a and of the shield 21a are registering holes arranged to receive loosely the threaded shank 46 of a fastening bolt 47. The end of the shank 46 is tapered as at 48 to facilitate insertion of the shank through said holes. The wheel support 5 is provided with a strap or bar 35a secured at its ends to the sides of the support 5 as by spot-welding 36a, and having a bridging portion in which is centrally secured a nut 49. The nut 49 is preferably nonrotatably connected to the bar 35a, and its interior is formed to threadingly receive the bolt shank 46. The nut 49 is preferably eccentric to the side plate structure. The bolt 47 is provided with a collar or flange 50 engageable with the guard wall 33a so as to force the side plate structure rearwardly into tight engagement with the body A outside of the well 1 or with the interior of the well 1a, as the case may be. A snap ring 50a snapped into a groove in the shank 46, or other suitable retaining means at the rear of the flange 50 serves to retain the bolt as a unit with the side plate structure. When such engagement with the body A is effected, the retaining portion 50a is preferably somewhat spaced from the nut 49 so that the nut will not interfere with tightening of the bolt 47.

The locking of the bolt 47 may be effected by providing the same with a peripheral groove 51 between the flange 50 and the wrench receiving portion 52, and applying a lock casing or housing 53 with a latch 54 adapted to project into the groove. The housing 53 is preferably shaped so that it cannot be rotated appreciably within the guard 26a, which in turn cannot be rotated with respect to the shield projection 22a because of the eccentricity of the bolt 47. The eccentricity of the bolt 47 and nut 49 to the side plate structure prevents appreciable rotation of the latter so that when the bolt is locked in the housing, the side plate structure is also locked against unauthorized removal. The latch 54 may be of the spring pressed type and bevelled at its rear side so as to readily snap over the wrench surface 52 into the groove 51 when the housing 53 is applied to the bolt 47. Or, if desired, the latch 54 may be so shaped and operated as to require its mechanical actuation inwardly by a key 55. In either event, retraction of the latch 54 is preferably effected by the key or other suitable anti-theft means. Upon retraction of the latch 54, the housing 53 may be readily removed and a wrench applied to the bolt 47 to withdraw the same if desired. Upon withdrawal of the bolt 47, the cover structure is completely released and may be withdrawn to render the wheel attaching nuts 11a accessible as seen in Figure 2.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a wheel assembly, a wheel having an inner attaching part, a support, means for fastening said part to said support, a shield having an outer rearwardly extending part adapted to fit about said fastening means to prevent access thereto, locking means cooperating with substantially central portions of said support and shield, a vehicle body having a well shaped to receive the inner side of the wheel and in which said support is disposed, cover means extending outwardly from said shield, and anti-rattling means engaged between said body and said cover means, said cover means being forced by said locking means to compress said anti-rattling means.

2. In a wheel assembly, the combination comprising a vehicle body having a support adapted to have a spare wheel detachably supported thereon, a spare wheel cover having an outer marginal portion engageable with said vehicle body, an auxiliary member centrally disposed on the outer side of said cover engageable near its outer edge with said cover but being spaced from said cover throughout a substantial portion of its area, and theft-proof locking means extending centrally through said auxiliary member in said cover into engagement with a portion of said body, said locking means including spring means for resiliently urging said auxiliary member and said cover towards said body, whereby a rearward biasing force is applied to said cover on a central portion thereof and also on an intermediate portion thereof.

3. In a wheel assembly, a wheel having an inner attaching part, a support, means for fastening said part to said support, a cover member having a rearwardly extending part adapted to fit about said fastening means to prevent access thereto, means for locking said cover member about said fastening means, a vehicle body having a well shaped to receive the inner side of the wheel and in which said support is disposed, said cover member including a portion extending outwardly over the front face of said wheel and drawn by said locking means toward the body of the mouth of the well, anti-rattling means between the outer edge of said cover member and said vehicle body, auxiliary means engageable with said cover member at a central point and at an intermediate point only, and locking means including spring means arranged to force said auxiliary means rearwardly against said cover member and said cover member rearwardly into resilient engagement with said anti-rattling means.

ARTHUR P. FERGUESON.